(12) United States Patent
Son et al.

(10) Patent No.: US 9,888,002 B2
(45) Date of Patent: Feb. 6, 2018

(54) M2M DATA MANAGEMENT

(71) Applicant: KT CORPORATION, Gyeonggi-do (KR)

(72) Inventors: Yeon-Joo Son, Incheon (KR); Myung-Eun Kwon, Seoul (KR); Yong-Joo Park, Seoul (KR); Ki-Hwan Ahn, Seoul (KR); Young-Bin Cho, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 77 days.

(21) Appl. No.: 14/191,780

(22) Filed: Feb. 27, 2014

(65) Prior Publication Data

US 2014/0245398 A1    Aug. 28, 2014

(30) Foreign Application Priority Data

Feb. 27, 2013  (KR) .................. 10-2013-0020829

(51) Int. Cl.
| | |
|---|---|
| *H04L 29/06* | (2006.01) |
| *H04W 12/04* | (2009.01) |
| *H04W 4/08* | (2009.01) |
| *H04W 4/00* | (2009.01) |
| *H04W 12/08* | (2009.01) |

(52) U.S. Cl.
CPC ............ *H04L 63/10* (2013.01); *H04L 63/062* (2013.01); *H04W 4/08* (2013.01); *H04W 12/04* (2013.01); *H04L 63/065* (2013.01); *H04L 63/0823* (2013.01); *H04W 4/005* (2013.01); *H04W 12/08* (2013.01)

(58) Field of Classification Search
CPC ..................... H04L 63/065; H04L 63/0823
See application file for complete search history.

(56) References Cited

U.S. PATENT DOCUMENTS 5,729,608 A * 3/1998 Janson .................. H04L 9/0827
                                                           380/30
5,748,736 A * 5/1998 Mittra .................. H04L 9/0822
                                                           713/155

(Continued)

FOREIGN PATENT DOCUMENTS

JP    2003-114930 A    4/2003
JP    2009-086884 A    4/2009

(Continued)

OTHER PUBLICATIONS

Li et al. "Group Device Pairing based Secure Sensor Association and Key Management for Body Area Networks". InfoCom (IEEE) May 6, 2010.*

(Continued)

*Primary Examiner* — Jung Kim
*Assistant Examiner* — Ngoc D Nguyen
(74) *Attorney, Agent, or Firm* — IP Legal Services, LLC

(57) ABSTRACT

Described embodiments provide managing data collected from machine 2 machine (M2M) devices. A plurality of M2M devices may be grouped based on a common interest and the same group authorization key may be assigned to M2M devices in the same device group. A data collecting terminal having a group authorization key may be allowed to collect data in M2M devices when the M2M devices have the same group authorization key.

15 Claims, 7 Drawing Sheets

(56) References Cited

U.S. PATENT DOCUMENTS

| | | | | |
|---|---|---|---|---|
| 6,015,390 | A * | 1/2000 | Krag | A61B 18/02 128/DIG. 27 |
| 6,295,361 | B1 * | 9/2001 | Kadansky | H04L 29/06 380/273 |
| 2005/0071646 | A1 * | 3/2005 | Hollingshead | G06Q 20/10 713/186 |
| 2007/0019807 | A1 * | 1/2007 | Jung | H04L 9/0833 380/44 |
| 2008/0200774 | A1 | 8/2008 | Luo | |
| 2011/0249817 | A1 * | 10/2011 | Park | H04L 9/0822 380/281 |
| 2012/0050047 | A1 | 3/2012 | Kim et al. | |
| 2012/0210136 | A1 * | 8/2012 | Haddad | H04L 63/0823 713/176 |
| 2015/0222604 | A1 * | 8/2015 | Ylonen | H04L 63/062 713/171 |

FOREIGN PATENT DOCUMENTS

| | | |
|---|---|---|
| JP | 2009-181561 A | 8/2009 |
| KR | 10-0546473 B1 | 1/2006 |
| KR | 10-2012-0019396 A | 3/2012 |
| WO | 2006/109954 A1 | 10/2006 |

OTHER PUBLICATIONS

Eschenauer et al. "A Key-Management Scheme for Distributed Sensor Networks". Computer and Communications Security (ACM) Nov. 18, 2002. pp. 41-47.*

Ektiweussy et al. "Dynamic key management in sensor networks". IEEE Communications Magazine 2006, vol. 44, Issue: 4, pp. 122-130.*

* cited by examiner

M2M DATA MANAGEMENT

CROSS REFERENCE TO PRIOR APPLICATIONS

The present application claims priority under 35 U.S.C. § 119 to Korean Patent Application No. 10-2013-0020829 (filed on Feb. 27, 2013), which is hereby incorporated by reference in its entirety.

BACKGROUND OF THE INVENTION

The present disclosure relates to machine to machine (M2M) communication, and more particularly, to managing and protecting data collected from M2M devices.

Machine to machine (M2M) communication technology has been applied in various industrial fields including a healthcare industry. For example, a M2M device has developed for automatically and regularly measuring vital signs from a patient. Such M2M device is attached to a patient's body. The measured vital signs are collected using a M2M data collecting terminal through M2M communication. Such information collected from the patient is very sensitive personal data that should be protected from being exposed to others.

SUMMARY OF THE INVENTION

This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with one aspect of the present invention, a plurality of machine 2 machine (M2M) devices having a common interest may be grouped into a device group and a group authorization key may be assigned to each device group.

In accordance with another aspect of the present invention, a data collecting terminal having a group authorization key may be allowed to collect data from M2M devices having the same group authorization key.

In accordance with at least one embodiment, a method may be provided for collecting and managing, by a terminal, data from a plurality of sensing devices each measuring the data from an associated object. The method may include receiving device information from a detected sensing device, obtaining a group authorization key assigned to a device group of the detected sensing device based on the received device information, transmitting the obtained group authorization key to the detected sensing device, receiving, from the detected sensing device, data measured from an object by the detected sensing device when the detected sensing device has a group authorization key identical to the transmitted group authorization key, otherwise, receiving an error message from the detected sensing device.

The receiving device information may include detecting a sensing device through near field communication; and obtaining the device information from the detected sensing device. The device information may include a device identification number.

The obtaining may include searching the group authorization key stored in a memory of the terminal and mapped with at least one of the device information of the detected sensing device and a device group of the detected sensing device. The obtaining may include transmitting a key request message with the obtained device information of the detected sensing device to a server for requesting a group authorization key assigned to the device group of the detected sensing device and receiving the group authorization key from the server.

The detected sensing device may be configured to receive a group authorization key from the terminal, compare the received group authorization key with a group authorization key stored in a memory of the detected sensing device, transmit the data measured from an object to the terminal when the received group authorization key is matched with the stored group authorization key, otherwise, transmit the error message to the terminal.

The method may further include transmitting a grouping request message for a first device group to a server, receiving a first group authorization key from the server in response to the group request message, and transmitting the received first group authorization key to sensing devices included in the first device group.

The method may further include transmitting a same group authorization key to sensing devices included in a same device group. The method may further include transmitting the received data to a server.

The method may further include detecting a sensing device to be removed from a corresponding device group, receiving device information from the detected sensing device, obtaining a group authorization key based on the received device information, transmitting a deletion request message with the obtained group authorization key to the detected sensing device, receiving a deletion completion message from the detected sensing device when the detected sensing device has a group authorization key matched with the transmitted group authorization key, otherwise, receiving an error message from the detected sensing device.

The detected sensing device may be configured to receive the deletion request message with the group authorization key from the terminal, to compare the received group authorization key with a group authorization key stored in a memory of the detected sensing device, to delete the stored group authorization key and transmit the deletion completion message when the received group authorization key is matched with the stored group authorization key, otherwise, to transmit the error message to the terminal.

The method may further include determining whether the detected sensing device is a registered sensing device, obtaining the group authorization key of the detected sensing device when the detected sensing device is the registered sensing device, otherwise, terminating a deletion procedure. The determining may include transmitting a registration confirmation message with the received device information of the detected sensing device to a server, receiving a confirmation response message from the server in response to the registration confirmation message, and determining whether the detected sensing device is the registered sensing device based on the received confirmation response message.

The method may further include detecting a sensing device to be changed from a current device group to a new device group, receiving device information from the detected sensing device, transmitting a key change request message with a first group authorization key associated with the current device group and a second group authorization key associated with the new device group to the detected sensing device, receiving a key change completion message from the detected sensing device when the detected sensing device has a group authorization key matched with the first group authorization key, otherwise, receiving an error message from the detected sensing device.

The detected sensing device may be configured to receive the key change message with the first group authorization key associated with the current device group and the second group authorization key associated with the new device group from the terminal, to compare the received first group authorization key with a group authorization key stored in a memory of the detected sensing device, to delete the stored group authorization key, store the second group authorization key, transmit the key change completion message when the received first group authorization key is matched with the stored group authorization key, otherwise, to transmit the error message to the terminal.

The method may further include receiving the first group authorization key associated with the current device group and a second group authorization key associated with the new device group from a server.

The server may be configured to analyze data collected from a first sensing device to determine whether a current device group of the first sensing device is changed to a new device group and to transmit a second group authorization key associated with the new device group to the terminal.

In accordance with at least one embodiment, a method may be provided for allowing, by a sensing device, a terminal to access data of the sensing device. The method may include receiving a group authorization key from the terminal, comparing the received group authorization key with a group authorization key stored in a memory of the sensing device, and allowing the terminal to access data stored in the sensing device when the received group authorization key is matched with the stored group authorization key.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Figure 1:
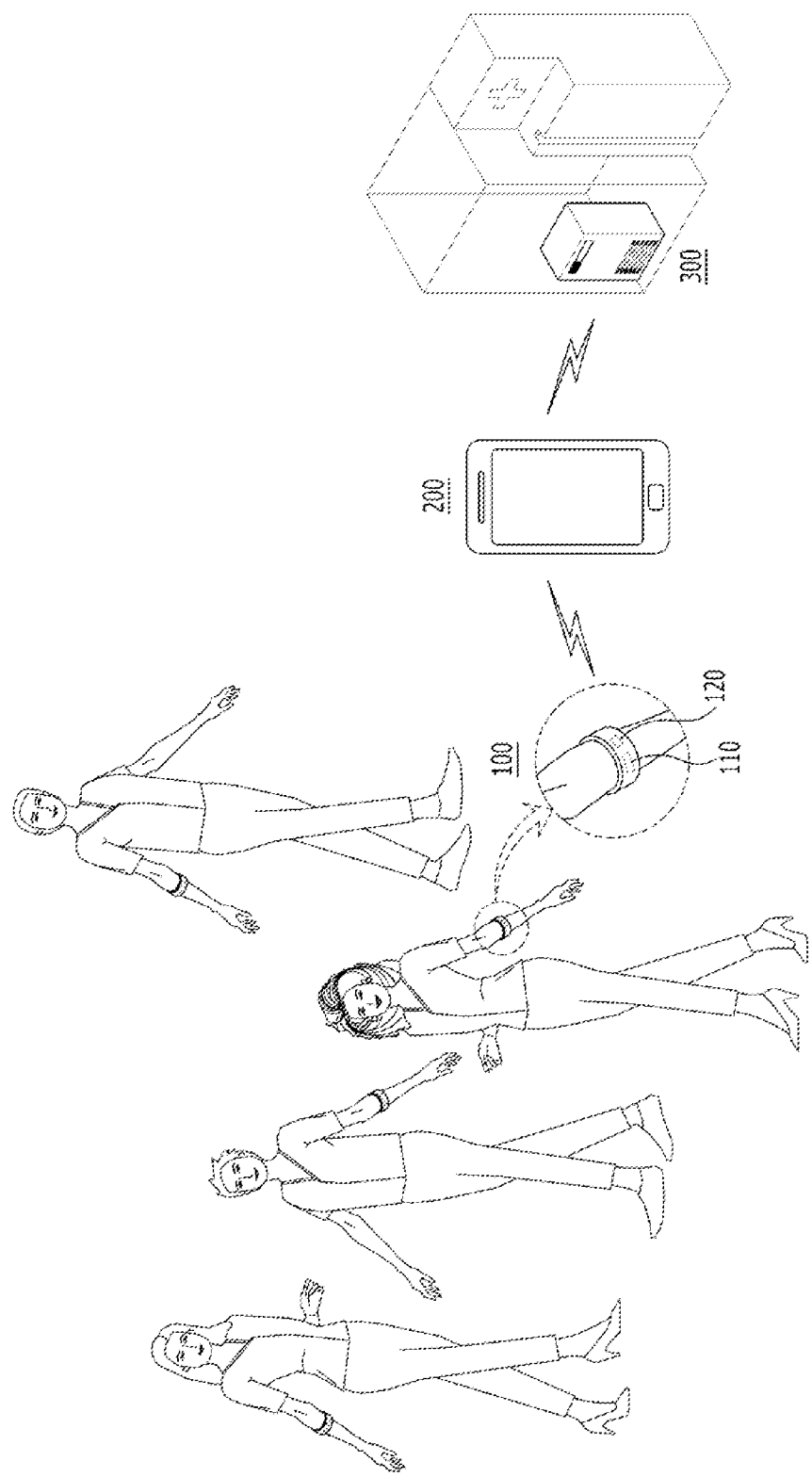
FIG. 1 illustrates a system for managing data collected from sensing devices while preventing the collected data from being exposed to others in accordance with at least one embodiment.

Reference will now be made in detail to embodiments of the present invention, examples of which are illustrated in the accompanying drawings, wherein like reference numerals refer to like elements throughout. The embodiments are described below, in order to explain the present invention by referring to the figures.

In accordance with at least one embodiment, a plurality of machine 2 machine (M2M) devices having a common interest may be grouped into a device group and a group authorization key may be assigned to each device group. A data collecting terminal having a group authorization key may be allowed to collect data from M2M devices when the M2M devices have the same group authorization key. Hereinafter, overall operation for such M2M data management will be described with reference to FIG. 1. For convenience and ease of understanding, a M2M system including at least one sensing device and a data collecting terminal will be described as collecting vital sign data from a patient and managing the collected vital sign data. However, the present invention is not limited thereto. The present invention may be applied to a M2M system collecting and managing any types of data.

FIG. 1 illustrates a system for managing data collected from sensing devices while preventing the collected data from being exposed to others in accordance with at least one embodiment.

Referring to FIG. 1, a system may group sensing devices having common factors (e.g., common interest) into a device group, assign a unique group authorization key to each device group, and control the sensing devices to transmit measured data to a terminal having the same group authorization key in accordance with at least one embodiment. Such a system may include a plurality of sensing devices (e.g., sensing device 100), data collecting terminal 200, and server 300, but the present invention is not limited thereto.

Sensing device 100 may be a M2M device attached at a user and regularly measures desired data of the user based on control information of sensing device 100. Sensing device 100 may transmit the measured data to data collecting terminal 200 upon the generation of a predetermined event. For example, sensing device 100 may be worn by a user. Sensing device 100 may be made in a form of a flexible band, an adhesive patch, a bracelet, a watch, or a ring, but the present invention is not limited thereto. Such sensing device 100 may measure predetermined vital signs of an associated user. Vital signs may include a body temperature, a blood pressure, a blood sugar level, electrocardiogram (ECG), electroencephalogram (EEG) and oxygen saturation level (SpO2). Sensing device 100 transmits the measured vital signs to data collecting terminal 200 when data collecting terminal 200 is located within a predetermined distance through near field communication.

Such sensing device 100 may include sensor 110 and communication circuit 120. Sensor 110 may measure desired vital sign data of a patient. Sensing device 100 is illustrated as having one sensor, but the present invention is not limited thereto. Sensing device 100 may include more than two sensors each measuring predetermined data from a user.

Communication circuit 120 may establish a communication link to data collecting terminal 200, receive various control signals from data collecting terminal 200, and transmit measured data to data collecting terminal 200. In order to communicate, communication circuit 120 may include a near field communication (NFC) circuit for contactless short range communication with other entities (e.g., data collecting terminal 200). For example, such a NFC circuit may include a processor and a memory. In accordance with at least one embodiment, the memory may store a group authorization key and information on a sensing device group.

Sensor 110 and communication circuit 120 are described as an independent device in FIG. 1, but the present invention is not limited thereto. For example, sensor 110 and communication circuit 120 may be integrated with other components. Sensor 110 and communication circuit 120 may be integrated in single NFC circuit.

Data collecting terminal 200 may collect measurement data (e.g., vital sign data) from a plurality of member sensing devices (e.g., sensing device 100) and manage the collected vital sign data of the member sensing devices. The member sensing device denotes a sensing device under the management of data collecting terminal 200. That is, data collecting terminal 200 has a control right to access and to manage data only in the member sensing devices. Such a control right may be assigned by server 300. The control right may be a group authorization key.

For example, data collecting terminal 200 may register member sensing devices at server 300. Data collecting terminal 200 may group sensing devices having a common factor into a device group and manage sending devices by a device group. Data collecting terminal 200 collects data from the member sensing devices and transmits the collected data to server 300 with information on the associated member sensing devices (e.g., device ID). That is, data collecting terminal 200 may serve as a gateway relaying the measured vital sign data from the member sensing devices to server 300.

Data collecting terminal 200 may be a portable computing device equipped with an NFC circuit. For example, data collecting terminal 200 may include a personal digital assistant (PDA), a hand-held computing device, a pad-like device, a smartphone, or a dedicated standalone portable terminal. Data collecting terminal 200 will be described in more detail with reference to FIG. 2.

Server 300 may perform operations for controlling sending devices to allow data access to a data collecting terminal only when the data collecting terminal has a corresponding group authorization key in accordance with at least one embodiment. Particularly, server 300 may receive a registration request from data collecting terminal 200 and register sensing devices as member sensing devices of data collecting terminal 200. For example, server 300 may store device information of sensing devices in connection with terminal information of data collecting terminal 200 and manage the stored device information and terminal information.

Furthermore, server 300 may receive a group registration request from data collecting terminal 200 and may assign a group authorization key. In addition, server 300 may determine whether it is necessary to change one of sensing devices from one group to the other based on the collected data from sensing devices. Such operation of sever 300 will be described in more detail with reference to FIG. 3.

Although server 300 is illustrated as a stand-alone computing server in FIG. 1, the present invention is not limited thereto. Server 300 may include a plurality of stand-alone computing servers. For example, server 300 may include a personal health record (PHR) server for storing patient's health records and/or an electronic medical record (EMR) server for storing patient's medical records.

As described, data collecting terminal 200 collects data from sending devices and transmits the collected data to server 300. Hereinafter, such data collecting terminal 200 will be described with reference to FIG. 2.

Figure 2:
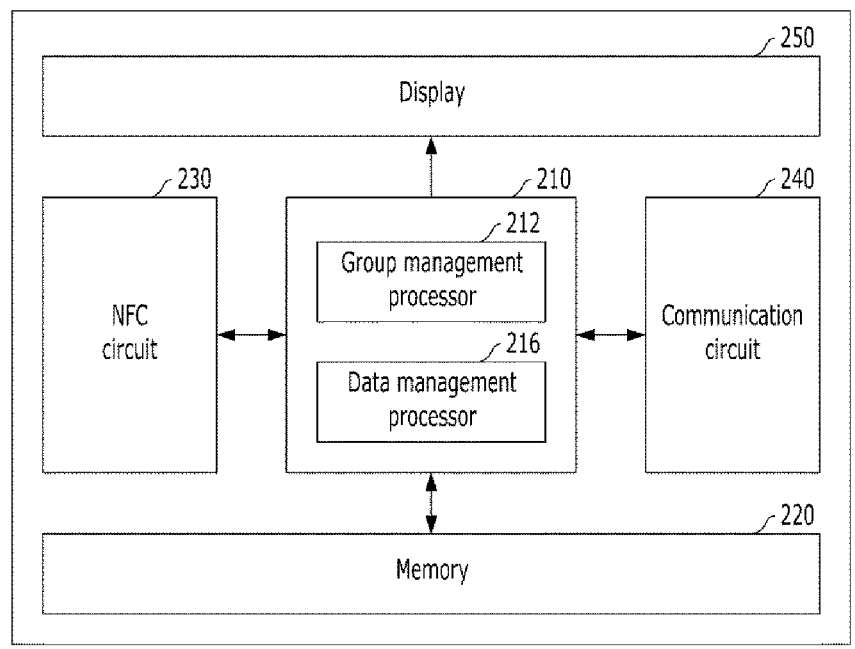
FIG. 2 illustrates a data collecting terminal in accordance with at least embodiment.

FIG. 2 illustrates a data collecting terminal in accordance with at least embodiment.

Referring to FIG. 2, data collecting terminal 200 may be a portable device having processing power with a memory and capable of communication to other entities (e.g., sensing device 100 and server 300). For example, data collecting terminal 200 may include processor 210, memory 220, NFC circuit 230, communication circuit 240, and display 250. Particularly, processor 210 may further include group management processor 212 and data management processor 216.

Processor 210 may control overall operation of the constituent elements of data collecting terminal 200. In accordance with at least one embodiment, processor 210 may perform operations for collecting vital sign data from sensing device 110 and transmitting the collected vital sign data to server 300. Processor 210 may perform operation for grouping sensing devices having a common factor into one group and managing sensing devices by the group. Processor 210 may perform operation for requesting a group authorization key for each device group to server 300 and providing the assigned a group authorization key to corresponding sending devices.

In accordance with at least one embodiment, processor 210 may include group management processor 212 and data management processor 216. Group management processor 212 may group sensing devices having a common interest into the same group and manage information on each device group. For example, such group information of a respective device group may include device identifications (e.g., device ID) of sensing devices belongs to a respective group, a group identification (e.g., group ID) of a respective device group, and user information (e.g., user ID) of a user associated with each sensing device belongs to a respective group. The group information may also include an access right (e.g., a group authorization key) for each device belongs to a respective group. Data management processor 216 may collect data from sensing device 100 and transmit the collected data to server 300 upon the generation of a predetermined event.

For performing such operation, processor 210 may execute a predetermined software program stored in memory 220. Such a predetermined software program may be installed for collecting data from sensing devices and managing the collected data in association with the sensing devices. The predetermined software program may be activated in response to a user input or upon generation of a predetermined event.

Processor 210 may perform operations for producing and displaying a user interface (e.g., graphic user interface) for managing sensing devices by each group. For example, processor 210 may execute a predetermined software program for the group management, produce a graphic user interface for the group management, and display the produced graphic user interface through display 250. Such a graphic user interface enables a user to organize sensing devices by a group, to select one of sensing devices in a respective group, to remove at least one of sensing devices from a respective group, or to add a new sensing device to an existing group.

Memory 220 may be used as a data storage device of data collecting terminal 200. Memory 220 may store information necessary for driving data collecting terminal 200 and performing certain operation requested by a user or upon generation of a predetermined event. Such information may include any software programs and related data. Memory 220 may be a flash memory, hard disk, multimedia card micro memory, SD or XD memory, Random Access Memory (RAM), Static Random Access Memory (SRAM), Read-Only Memory (ROM), Programmable Read-Only Memory (PROM), Electrically Erasable Programmable Read-Only Memory (EEPROM), magnetic memory, magnetic disk, or optical disk, but is not limited thereto.

In accordance with at least one embodiment, memory 220 may store data collected from sensing devices. Such data may be vital sign data measured at each sending device. Memory 220 may store registration information of each sensing device. Such registration information may include device information (e.g., device ID) of each member sensing device. Memory 220 may store access right information in connection with device information. Furthermore, memory 220 may store group authorization keys for each device group. That is, memory 220 may store various types of information including device information (e.g., device ID) of member sensing devices, terminal information (e.g., terminal ID), group authorization keys of each device group, and so forth.

Display 250 may display information and graphic user interfaces for managing sensing device groups. Display 250 may receive the image data from processor 210 and display the received image data. The image data may be produced as a result of certain operations performed by any software programs installed in data collecting terminal 200. For example, the image data may be data processed for displaying a graphic user interface produced by an operation system and applications, performed in data collecting terminal 200. Also, the image data may further include still images and moving images, produced or processed by processor 210. For example, display 250 may be a liquid crystal display (LCD) panel or an active-matrix organic light-emitting diode (AMOLED) panel, but the present invention is not limited thereto.

In accordance with at least one embodiment, display 250 may display a graphic user interface that enables a user to organize sensing devices by a group, to select one of sensing devices in a respective group, or to delete at least one of sensing devices from a respective group. Furthermore, display 250 may display a graphic user interface that enables a user to register sensing devices, to register a device group, to set user information, and so forth.

NFC circuit 230 may establish a communication link with sensing device 100 (e.g., NFC tag in sensing device). NFC circuit 230 may include an NFC chip for performing contactless communication to sensing devices.

Communication circuit 240 may establish a communication link to server 300 and receive information from or transmit information to server 300 through the communication link. For example, communication circuit 240 perform communication based on Digital Subscriber Line (xDSL), Hybrid Fiber Coaxial (HFC), Power Line Communication (PLC), satellites, GSM EDGE Radio Access Network (GERAN), UMTS Terrestrial Radio Access Network (UTRAN), evolved UMTS Terrestrial Radio Access Network (eUTRAN), Wireless Local Area Network (WLAN), and Worldwide Interoperability for Microwave Access (WiMAX), or a mobile communication network based on CDMA/WCDMA or GSM/GPRS.

As described, server 300 assigns a group authorization key to each device group and controls sending devices to allow data access to only data collecting terminals having a corresponding group authorization key. Hereinafter, such a server will be described with reference to FIG. 3.

Figure 3:
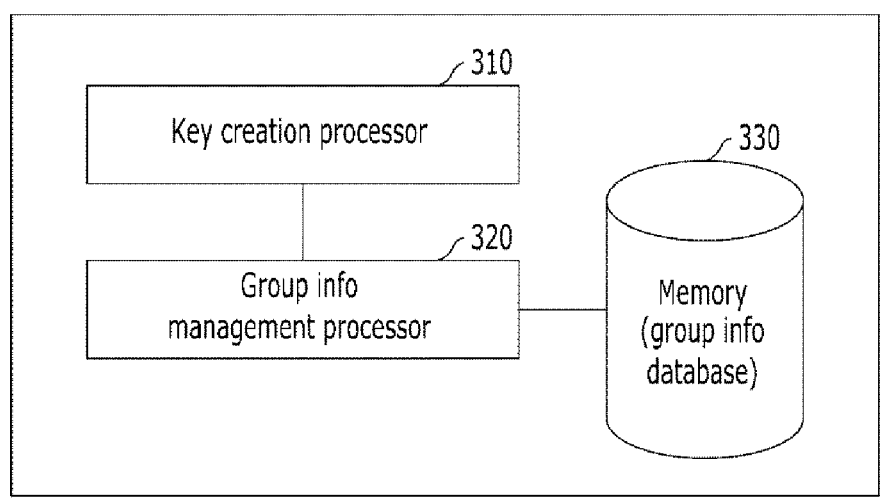
FIG. 3 illustrates a server in accordance with at least one embodiment.

FIG. 3 illustrates a server in accordance with at least one embodiment.

Referring to FIG. 3, server 300 may include key creation processor 310, group info management processor 320, and memory 330 (e.g., group info database). Key creation processor 310 may generate a group authorization key for each device group including a plurality of sensing devices associated with a common interest. Server 300 may encrypt the group authorization key, but the present invention is not limited thereto.

Group info management processor 320 may perform operations for managing information on each sensing device group. For example, such group information of each device group may include a group authorization key, device IDs of devices belong to a corresponding sensing device group, and user IDs of users wearing one of sensing devices belong to a corresponding sensing device group with associated terminal information (e.g., terminal ID of data collecting terminal 200).

Group info management processor 320 may perform operations for creating group information of each sensing device group and may manage created group information of each sensing device group. For example, group info management processor 320 may perform operations for changing a group of each sensing device, removing one of sensing devices from a group, or adding a new sensing device to an existing group. Furthermore, group info management processor 320 may perform operations for updating group information and for reconfiguring control information of each sensing device.

Memory 330 may store various types of information for managing measurement data from sensing devices, assigning a group authorization key to each device group, and controlling sensing devices to allow data access to only data collecting terminals having a corresponding group authorization key.

Hereinafter, operations for controlling sensing devices to allow data access to data collecting terminals by assigning a group authorization key will be described with reference to FIG. 4 to FIG. 7. For convenience and ease of understanding, a sending device will be described as including a NFC tag and a data collecting terminal will be described as detecting the sensing device, transmitting data to, and receiving data from the sending device based on the NFC tag of the sending device. However, the present invention is not limited thereto. For example, the detection of the sending device and the communication between the sending device and the data collecting terminal may be performed through other communication circuits in the sending device and the data collecting terminal FIG. 4 illustrates registering sensing devices at a server in accordance with at least one embodiment.

Figure 4:
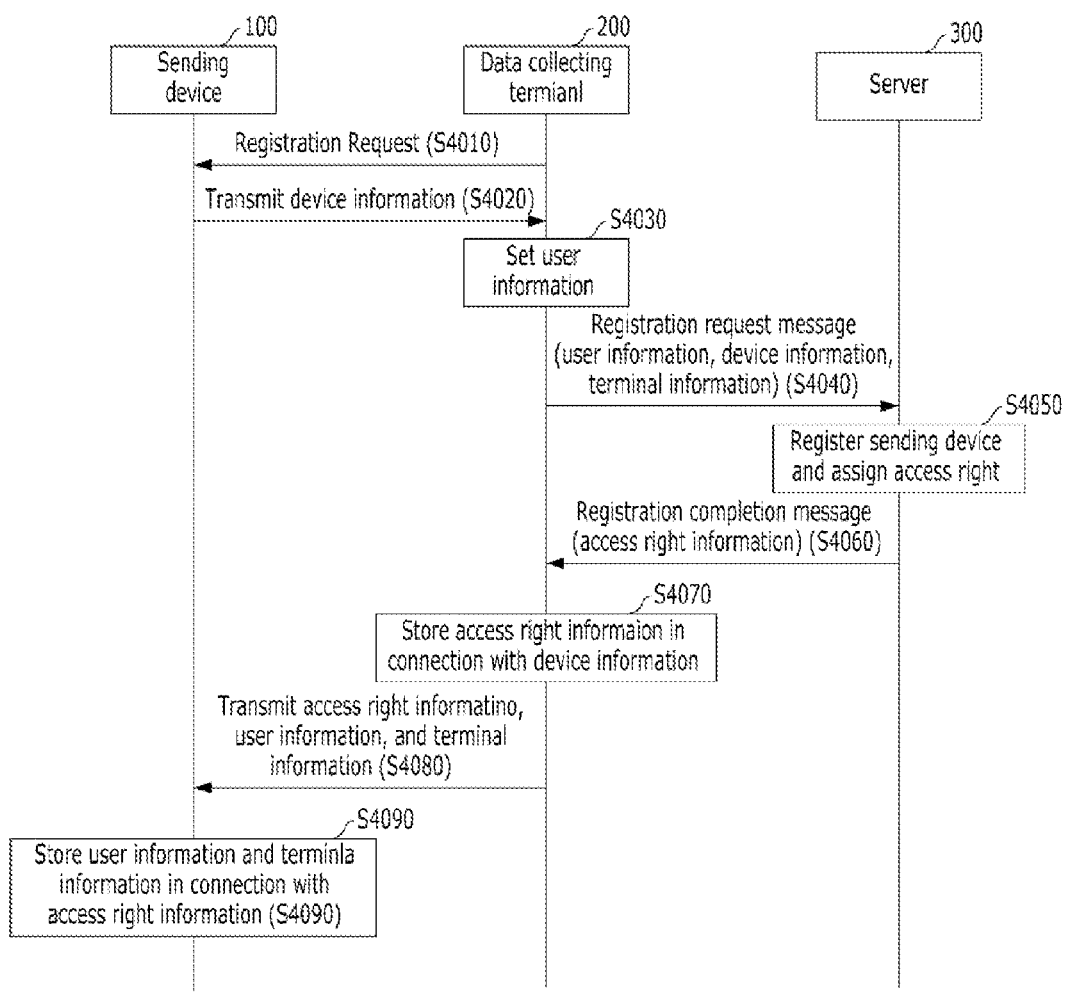
FIG. 4 illustrates registering sensing devices at a server in accordance with at least one embodiment.

Referring to FIG. 4, data collecting terminal 200 may obtain information on sensing devices of target persons to monitor and register the sending devices at server 300 with the obtained information for monitoring the target persons' conditions. Such registration procedure may be performed as follows.

At step S4010, data collecting terminal 200 may transmit a registration request to sensing device 100. For example, when an operator of data collecting terminal 200 (e.g., a doctor or a nurse) wants to collect vital sign data from sending device 100, the user taps data collecting terminal 200 on sending device 100. Upon such a tapping operation, data collecting terminal 200 detects a NFC chip of sending device 100 and transmit a signal to request information for registration (e.g., registration request).

At step S4020, in response to the registration request, sensing device 100 may transmit device information to data collecting terminal 200. For example, sending device 100 may receive a signal (e.g., the registration request) from data collecting terminal 200. Such a signal may be a control command to read certain information in a memory of the NFC chip (e.g., or a memory of sending device 100) and return the read information to data collecting terminal 200. In response to such a signal, sending device 100 transmits device information to data collecting terminal 200. The device information may include information on sending device 100 with a device identification number (e.g., device ID). The device ID may be a unique number indicating each sensing device. In addition to the device information, sending device 100 may transmit information on an associated user who wears sending device 100. Such user information may include information on a user with a user identification number (e.g., user ID). The present invention, however, is not limited thereto.

At step S4030, upon the receipt of the device information from sensing device 100, data collecting terminal 200 may perform a user setup operation based on the received device information. For example, data collecting terminal 200 may set information on a user associated with sending device 100. Such a user may be a patient wears sending device 100. The user information may include a user identification number (e.g., a user ID), a name, an age, a gender, a name of a disease, a diagnose history, and so forth. The user information may be received from sending device 100, but the present invention is not limited thereto. Based on the received device information (e.g., device ID), data collecting terminal 200 may obtain associated user information from server 300. Alternatively, such user information may be received directly from an operator of data collecting terminal 200 (e.g., doctor or nurse). Data collecting terminal 200 may store and manage the received device information in connection with the associated user information At step S4040, data collecting terminal 200 may request server 300 to register sending device 100. For example, data collecting terminal 200 may transmits a registration request message to server 300. The registration request message may include the device information of sending device 100 and the user information of a user having sending device 100. Furthermore, the registration request message may include information on data collecting terminal 200. Such terminal information may include a terminal identification number (e.g., terminal ID).

At step S4050, in response to the registration request from data collecting terminal 200, server 300 may perform operations for registering sensing device 100. For example, server 300 may obtain the device information, the user information, and the terminal information from the registration request message from data collecting terminal 200. Server 300 may store the obtained information from data collecting terminal 200 in memory 330 to register sending device 100 and manage sending device 100 as a registered sending device in connection with the device information, the user information, and the terminal information.

In accordance with at least one embodiment, server 300 may regulate each data collecting terminal (e.g., data collecting terminal 200) to access registered sensing devices. For example, server 300 may assign an access right to data collecting terminal 200 in order to allow data collecting terminal 200 to retrieve and to modify information of each sensing device. That is, data collecting terminal 200 is able to retrieve and to update information on sensing device 100 only if data collecting terminal 200 is assigned with an access right of sensing device 100.

At step S4060, server 300 may transmit a registration completion message to data collecting terminal 200 for notifying the completion of the registration. For example, server 300 may transmit registration completion information to data collecting terminal 200 with the response message. Such registration completion information may include the associated user information (e.g., a user ID), the associated device information (e.g., device ID), and the assigned access right information.

At step S4070, data collecting terminal 200 may receive the registration completion information from server 300. For example, data collecting terminal 200 may store the received registration completion information of sensing device 100. That is, data collecting terminal 200 may store and manage the device information of sending device 100 with the assigned access right information and the user information.

At step S4080, data collecting terminal 200 may transmit the registration completion message to registered sensing device 100. The registration completion message may include the assigned access right information and the user information with the terminal information (e.g., terminal ID) of data collecting terminal.

At step S4090, sensing device 100 may receive the registration completion message and store the user information, the assigned access right information, and the terminal information. Upon the receipt of the registration completion message, sending device 100 may store the assigned access right information in connection with the terminal information of data collecting terminal 100.

After storing the assigned access right information in connection with the terminal information, sending device 100 may only allow a data collecting terminal having the access right to access data stored in sending device 100 based on the stored access right information. That is, sending device 100 may only allow a data collecting terminal having an access right matched with the stored access right information in connection with an associated terminal ID to write data to or to read data from sending device 100.

As described, a plurality of registered sending devices having a common interest is group to a group and managed by a group in accordance with at least one embodiment. Such operation will be described with reference to FIG. 5.

Figure 5:
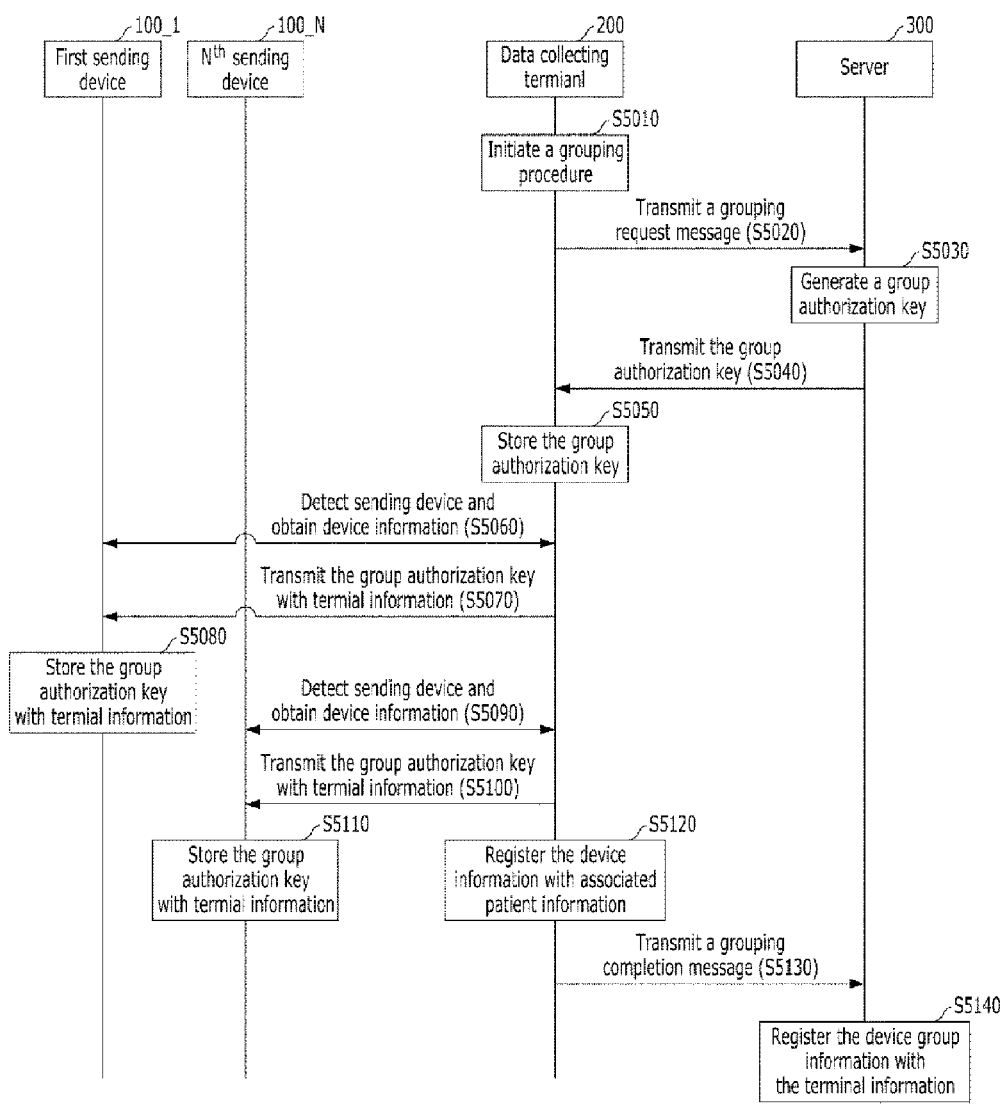
FIG. 5 illustrates grouping registered sensing devices in accordance with at least one embodiment.

FIG. 5 illustrates grouping registered sensing devices in accordance with at least one embodiment.

Referring to FIG. 5, data collecting terminal 200 may initiate a grouping procedure at step S5010. For example, such a grouping procedure may be triggered in response to a user input. Such a user input may be received from an operator of data collecting terminal 200 through a user interface of data collecting terminal 200. When a hospital needs to monitor multiple patients together, such a grouping procedure may be initiated. Sending devices of such target patients may be grouped together.

At step S5020, data collecting terminal 200 may transmit a grouping request message to server 300. Such a grouping request message may include terminal information (e.g., terminal ID) of data collecting terminal 200.

At step S5030, server 300 may generate a group authorization key in response to the grouping request message. For example, in response to the grouping request message, server 300 may obtain the terminal information of data collecting terminal 200 and generate a group authorization key. The group authorization key may be a unique identification key assigned to each group created by a respective data collecting terminal.

At step S5040, server 300 may transmit the generated group authorization key to data collecting terminal 200. For example, server 300 may temporally store the generated group authorization key in connection with the terminal information (e.g., terminal ID) of data collecting terminal 200.

At step S5050, data collecting terminal 200 may receive and store the group authorization key. After storing the group authorization key, data collecting terminal 200 may perform a device grouping operation as follows.

At step S5060, data collecting terminal 200 may detect first sensing device 100-1 and obtain device information of first sending device 100-1 and associated user information. For example, in order to group sending devices having a common interest, data collecting terminal 200 starts detecting sending devices to be included in a group. That is, an operator of data collecting terminal 200 may tap data collecting terminal 200 on one of the target sending devices. Upon the tapping operation, data collecting terminal 200 detects first sensing device 100-1 (e.g., a NFC chip) through near field communication. Upon the detection, data collecting terminal 200 may read device information (e.g., device ID) of first sensing device 100-1 from a NFC tag thereof, but the present invention is not limited thereto. Data collecting terminal 200 may request first sending device 100-1 to send device information and first sending device 100-1 may transmit device information to data collecting terminal 200 in response to the request.

Upon the receipt of the device information (e.g., device ID) from first sensing device 100-1, data collecting terminal 200 may determine whether first b sensing device 100-1 is a registered sensing device. If first sensing device 100-1 is not registered, data collecting terminal 200 may perform the registration procedure for registering first sensing device 100-1 as show in FIG. 4.

In addition, data collecting terminal 200 may identify a user of first sensing device 100-1 at the step S5060. In order to identify the user, data collecting terminal 200 may obtain the user information from server 300 based on the device information on first sensing device 100-1. After obtaining the user information, data collecting terminal 200 may encrypt the user information in order to prevent the obtained user information from being exposed to others. For example, data collecting terminal 200 may generate patient identification information (e.g., patient ID) by mapping the user ID in the user information to the device ID of first sensing device 100-1 and discard the user information.

At step S5070, data collecting terminal 200 may transmit the group authorization key with the terminal information to first sensing device 100-1. At step S5080, first sensing device 100-1 may receive the group authorization key with the terminal information of data collecting terminal 200 and store the group authorization key in connection with the terminal information of data collecting terminal 200.

Such grouping operation (S5060 to S5080) may be continuously performed for grouping other devices (e.g., second sending device to $N^{th}$ sensing device 100-N) as shown in steps S5090 to S5110. Since the grouping operation S5090 to S5110 are about identical to the grouping operation S5060 to S5080, the detailed descriptions thereof will be omitted herein.

At step S5120, data collecting terminal 200 registers the obtained device information with the associated patient information after obtaining device information from all of target sensing devices 100-1 to 100-N. For example, data collecting terminal 200 may store the obtained device information (e.g., device ID) of target sending devices 100-1 to 100-N to server 300 with the terminal information (e.g., terminal ID) of data collecting terminal 200 as device group information. Such group registration operation may be performed after receiving a grouping completion message from all target sensing devices 100-1 to 100-N. The group registration message may include device group information and the terminal information of data collecting terminal 200. The device group information may include the device identification information (e.g., device ID of each sensing device in a group), the encrypted patient identification information (e.g., generated patient ID of each member sensing device) and/or a group authorization key (e.g., group authorization key of the corresponding device group).

At step S5130, data collecting terminal 200 may transmit a grouping completion message to server 300. The grouping completion message may include group information (e.g., a group name, a group ID), the device information and the encrypted patient identification information of all member sensing devices in the sensing device group with the terminal information of data collecting terminal 200.

At step S5140, server 300 may register the device group information in connection with the terminal information of data collecting terminal 100. For example, server 300 may store the device group information in the grouping completion message and manages the device group information in connection with the terminal information and the associated group authorization key.

As described, data collecting terminal 200 collects vital sign data from member sensing devices in a group based on an assigned group authorization key and delivers the collected vital sign data to server 300. Hereinafter, such operation of data collecting terminal will be described with reference to FIG. 6.

Figure 6:
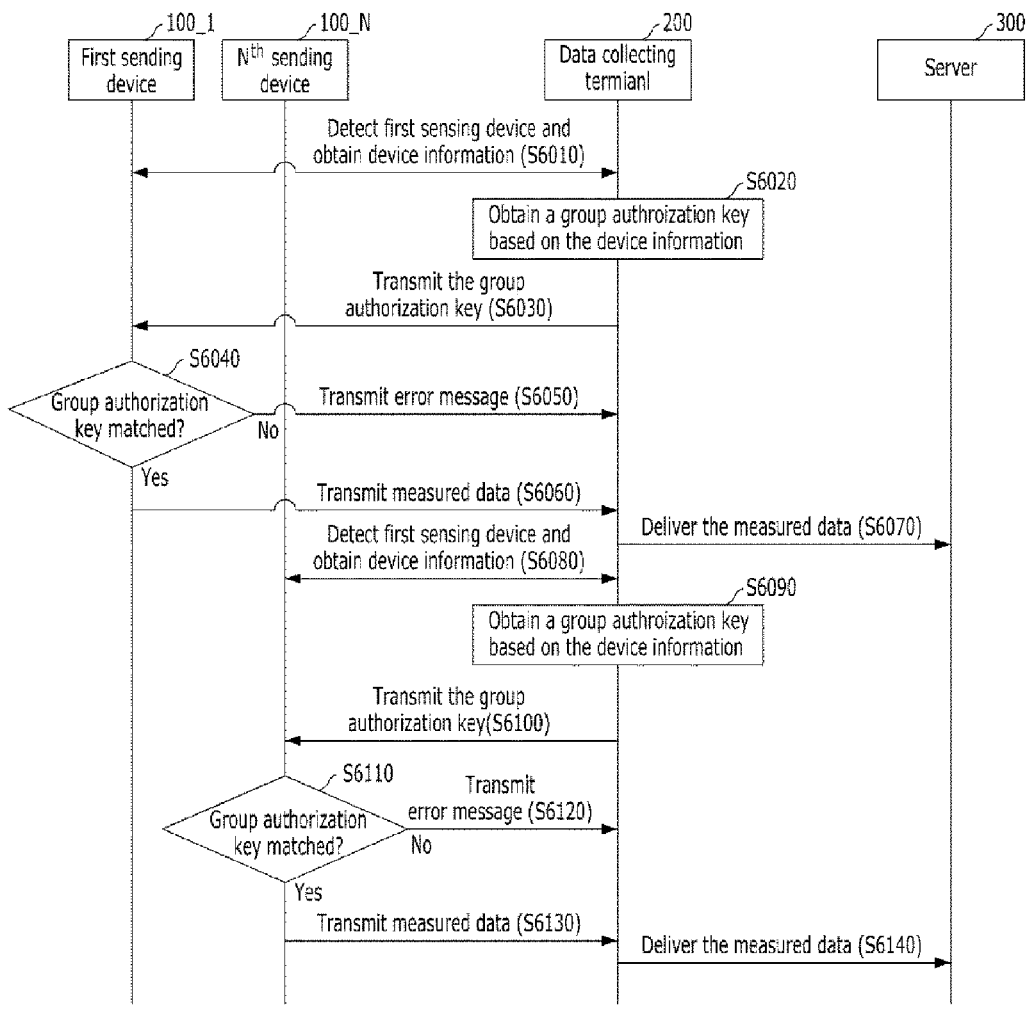
FIG. 6 illustrates collecting and transmitting vital sign data at a data collecting terminal in accordance with at least one embodiment.

FIG. 6 illustrates collecting and transmitting vital sign data at a data collecting terminal in accordance with at least one embodiment.

Referring to FIG. 6, data collecting terminal 200 may detect first sensing device 100-1 and obtain device identification information from first sensing device 100-1 at step S6010. For example, an operator (e.g., a doctor, a nurse) of data collecting terminal 200 may tap data collecting terminal 200 on first sensing device 100-1 for collecting vital sign data from first sending device 100-1. Upon Data collecting terminal 200 detects the NFC chip (e.g., NFC tag) of first sensing device 100-1 and obtains device identification information (e.g., device ID) from the detected NFC chip of first sensing device 100-1. Particularly, first sensing device 100-1 may transmit device identification information (e.g., device ID) to data collecting terminal 200. The present invention, however, is not limited thereto. Instead of receiving the device identification information from first sensing device 100-1, data collecting terminal 200 may transmit terminal information to first sensing device 100-1. Furthermore, data collecting terminal 200 may transmit terminal information to first sensing device 100-1 and receive device identification information from first sensing device 100-1.

At step S6020, data collecting terminal 200 may obtain a group authorization key based on the obtained device information. For example, data collecting terminal 200 needs to have a group authorization key to obtain data from member sending devices of a corresponding group. Accordingly, data collecting terminal 200 may search for a group authorization key associated with the device information of first sending device 100-1 through a memory thereof. Such information may be stored during the group registration procedure shown in FIG. 5. Alternatively, data collecting terminal 200 may transmit a key request message with the obtained device information of first sensing device 100-1 to server 300 in order to request a group authorization key associated with first sensing device 100-1 to server 300. Server 300 may provide the requested group authorization key to data collecting terminal 200 based on the device group information associated with the terminal information of data collecting terminal 200 and the device information of first sensing device 100-1.

At step S6030, data collecting terminal 200 may transmit the obtained group authorization key to first sensing device 100-1. At step S6040, first sensing device 100-1 may determine whether data collecting terminal 200 has a control right to access data therein based on the received group authorization key. For example, first sensing device 100-1 compares the received group authorization key with a stored group authorization key in connection with the terminal information (e.g., terminal ID) of data collecting terminal 200 in a memory of first sensing device 100-1.

When the received group authorization key is not matched with the stored group authorization key (No—S6040), first sending device 100-1 may transmit an error message to data collecting terminal 200 at step S6050.

When the received group authorization key is matched with the stored group authorization key (Yes—S6040), first sending device 100-1 may transmit measured data to data collecting terminal 200 at step S6060.

At step S6070, data collecting terminal 200 may receive the vital sign data from first sensing device 100-1 and transmit the received vital sign data to server 300.

Data collecting terminal 200 may continuously perform such data collection operation S6010 to S6070 for other member sensing devices (e.g., second sending device 100-2 to Nth sending device 100-N) to collect measured vital sign data from other member sensing devices in the same group as shown in steps S6080 to S6140.

As described, data collecting terminal 200 may collect personal data from a plurality of sending devices while protecting the personal data from being exposed to others by perform the authentication procedure based on the group authorization key. Since such authentication procedure is very simple and easy, a number of patients may be monitored quickly when there are many patients in preschools or schools.

When an operator wants to add a new sensing device in an existing group, the new sensing device may be added to the group through operations similar to the device registration procedures described in FIG. 4 and the grouping procedures described in FIG. 5. However, when an operator wants to remove one of member sensing devices from a group, an authorization key stored in the sending device must be deleted in order to prevent a third part from accessing the sensing device. Such operation will be described with reference to FIG. 7.

Figure 7:
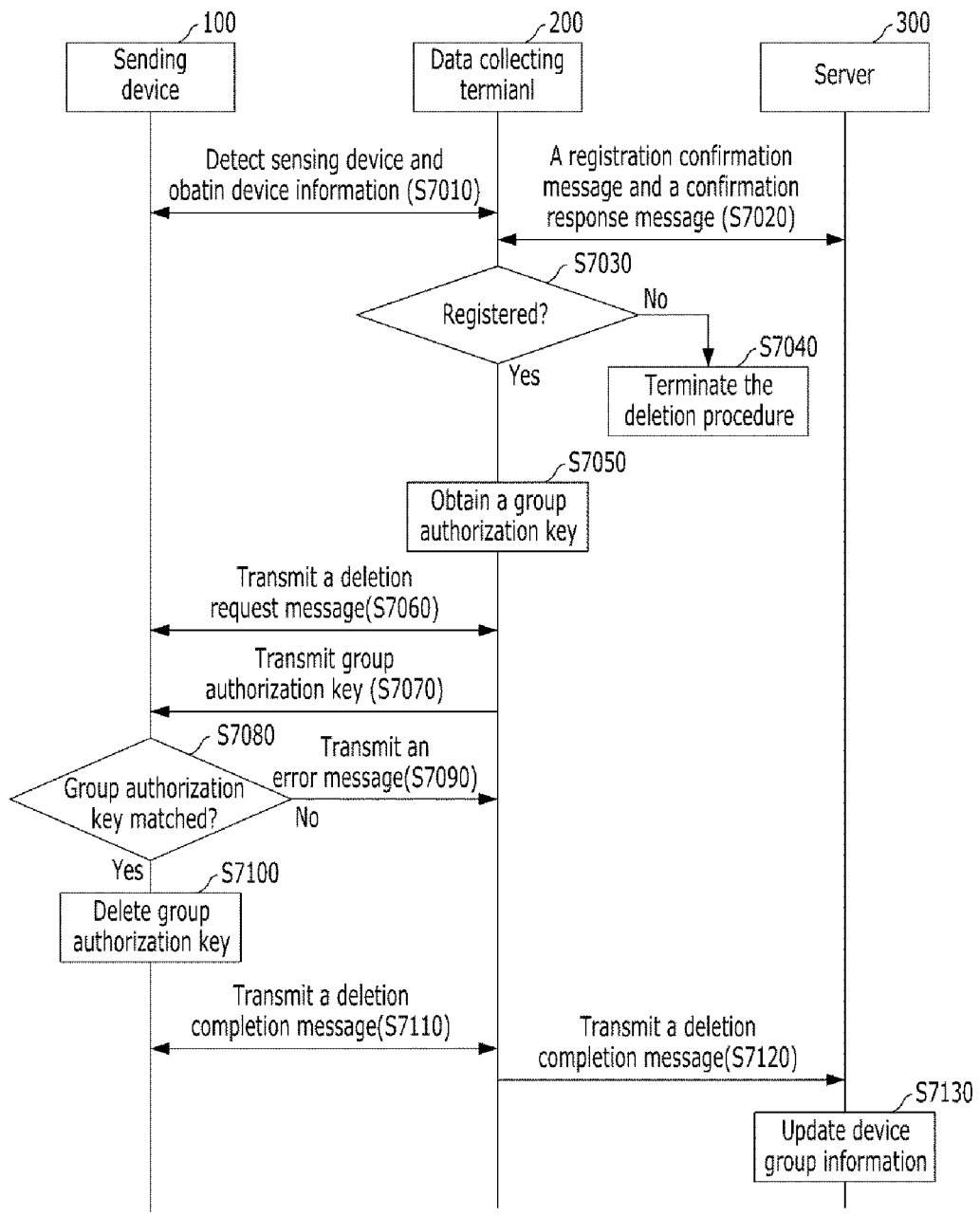
FIG. 7 illustrates removing a sensing device from a corresponding device group in accordance with at least one embodiment.

FIG. 7 illustrates removing a sensing device from a corresponding device group in accordance with at least one embodiment.

Referring to FIG. 7, data collecting terminal 200 may detect a target sensing device (e.g., sensing device 100) to be removed from a corresponding device group and obtain device identification information from the detected sensing device at step S7010.

At step S7020, data collecting terminal 200 may transmit a registration confirmation message to server 300 and receive a confirmation response message from server 300. For example, data collecting terminal 200 may request server 300 to determine whether the detected sensing device 100 is a registered device based on the obtained device identification information by transmitting the registration confirmation message with the obtained device information of sensing device 100. In response to the request, data collecting terminal 200 receives a confirmation response message from server 300.

At step S7030, data collecting terminal 200 may determine whether the detected sensing device is registered device or non-registered device based on the confirmation response message. When sensing device 100 is not a registered device (No—S7030), data collecting terminal 200 terminates the deletion procedure at step S7040. For example, data collecting terminal 200 may display an error message or a message of "non-registered device". When sensing device 100 is a registered device (Yes—S7030), data collecting terminal 200 may obtain a group authorization key of detected sensing device 100 at step S7050.

At step S7060, data collecting terminal 200 may transmit a deletion request message to sensing device 100 with the terminal information (e.g., terminal ID) of data collecting terminal 200. At step S7070, data collecting terminal may transmit the obtained group authorization key to sensing device 100.

At step S7080, sensing device 100 determines whether data collecting terminal 200 has a deletion right based on the received group authorization key. That is, sensing device 100 compares the received group authorization key with a group authorization key stored in connection with the terminal ID of data collecting terminal 200.

When the received group authorization key is not matched (No—S7080), sensing device 100 may transmit an error message to data collecting terminal 200 at step S7090. When the received group authorization key is matched (Yes—S7080), sensing device 100 may delete the requested group authorization key stored in the memory at step S7100.

At step S7110, sensing device 100 transmits a deletion completion message to terminal 200. At step S7120, data collecting terminal 200 receives the deletion completion message from sensing device 100, updates the associated group information and the associated device information, and transmits a deletion completion message to server 300 with the device information (e.g., device ID) of sensing device 200 and the device group information (e.g., group ID). At step S7130, server 300 receives the deletion completion message and updates corresponding device group information.

When a patient's condition becomes better or changed, a sensing device of the patient may be controlled to measure a predetermined vital sign less frequently. In this case, such sensing device 100 may be moved from one group to the other. Such operation will be described with reference to FIG. 8.

Figure 8:
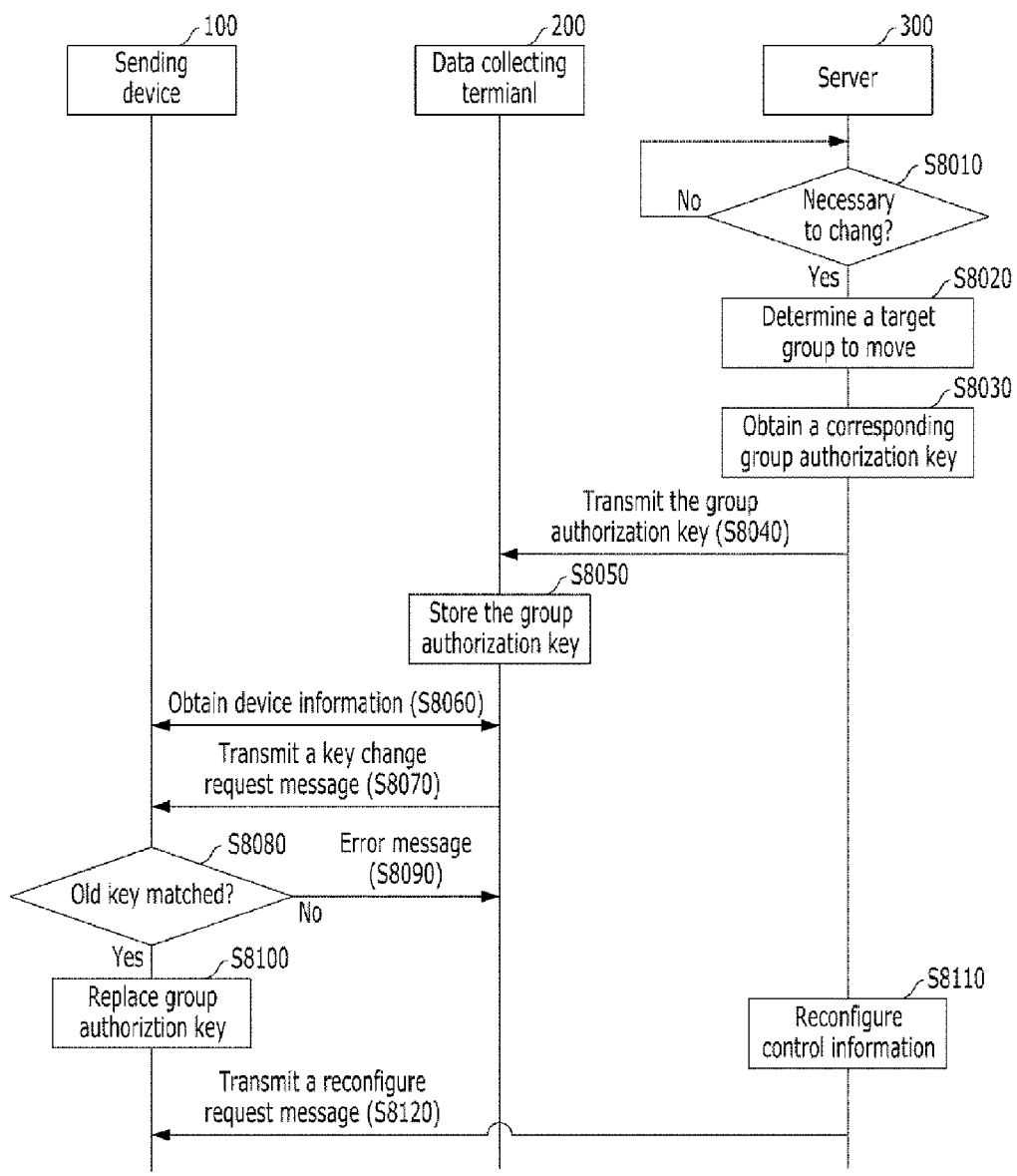
FIG. 8 illustrates modifying device group information by a server in accordance with at least one embodiment.

FIG. 8 illustrates modifying device group information by a server in accordance with at least one embodiment.

Referring to FIG. 8, at step S8010, server 300 may determine whether it is necessary to move sensing device 100 to a different group. Such determination operation may be automatically initiated based on vital sign data collected from sensing device 100 or at a regular interval. Furthermore, the determination operation may be initiated by a user input. When it is necessary to move sensing device 100 to a different group (Yes—S8010), server 300 may determine a target group to move sensing device 100 at step S8020. The present invention, however, is not limited thereto. Such determination may be made in terminal 200.

At step S8030, server 300 may obtain a corresponding group authorization key of the determined group from a corresponding database or generates a new group authorization key. At step S8040, server 300 may transmit the obtained group authorization key to data collecting terminal 200. At step S8050, data collecting terminal 200 may store the received group authorization key in connection with device information of sensing device 100.

At step S8060, data collecting terminal 200 may detect sensing device 100 and obtain device information of sensing device 100. During the detection, data collecting terminal 200 may obtain device information from sensing device 100 and determine whether sensing device 100 is a registered device in connection with server 300, but the present invention is not limited thereto.

At step S8070, data collecting terminal 200 may transmit a key change request message to sensing device 100 with the new group authorization key and the old group authorization key. At step S8080, sensing device 100 determines whether data collecting terminal 200 has a valid control right by comparing the received old group authorization key with a group authorization key stored in connection with the terminal information of data collecting terminal 200.

When the received old group authorization key is not matched with the stored group authorization key (No— S8080), sensing device 100 may transmit an error message to data collecting terminal 200 at step S8090. When the received old group authorization key is matched with the stored group authorization key (Yes—S8080), sensing device 100 may replace the new group authorization key with the stored group authorization key at step S8100.

At step S8110, server 300 may update the device group information associated with sensing device 100 and reconfigure control information of sensing device 100. At step S8120, server 300 may transmit a reconfigure request message to sensing device 100. For example, server 300 may transmit the reconfigured control information with the reconfigure request message. The reconfigured control information may include information on how to control sensing device 100 according to properties of a new group. Such control information may include a measuring data type, a measuring interval, a measuring target part, and so forth.

Although at least one device belonging to one group is described, one device may be configured to belong to at least two other groups. In this case, the device stores at least two group authorization keys and each of the data collecting terminal 200 and the server 300 manages at least two group authorization keys with respect to one device. For this, proper group identification information for distinguishing each group authorization key may need to be added and group identification information may be added to information exchanged between a device and a data collecting terminal or between a data collecting terminal and a server.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of collecting and managing, by a terminal, data from a plurality of sensing devices each measuring the data from an associated object, the method comprising:
   receiving device information from a detected sensing device;
   obtaining a group authorization key assigned to a device group of the detected sensing device based on the received device information;
   transmitting the obtained group authorization key to the detected sensing device;
   receiving, from the detected sensing device, data measured from an object by the detected sensing device when the detected sensing device has a group authorization key matched with the transmitted group authorization key;
   otherwise, receiving an error message from the detected sensing device,
   wherein the group authorization key is generated by a server in response to a request from the terminal and assigned to sensing devices belonging to a same device group, and
   wherein the method further comprises:
   receiving, from the server, target device information on a target sensing device to be changed from a current device group to a new device group and a second group authorization key associated with the new device group;
   detecting a second sensing device and receiving device information from the second sensing device;
   determining whether the second sensing device is the target sensing device to be changed based on the received target device information from the server and the device information from the second sensing device;
   transmitting a key change request message with a first group authorization key associated with the current device group and the second group authorization key associated with the new device group to the second sensing device;
   receiving a key change completion message from the second sensing device when the detected second sensing device has a group authorization key matched with the first group authorization key;
   otherwise, receiving an error message from the detected second sensing device.

2. The method of claim 1, wherein:
   in the receiving device information, the detected device is detected through near field communication;
   the device information is obtained from the detected sensing device;
   the device information includes a device identification number.

3. The method of claim 1, wherein the obtaining comprises:
   searching the group authorization key stored in a memory of the terminal and mapped with at least one of the device information of the detected sensing device and a device group of the detected sensing device.

4. The method of claim 1, wherein the obtaining comprising:
   transmitting a key request message with the obtained device information of the detected sensing device to a server for requesting a group authorization key assigned to the device group of the detected sensing device; and
   receiving the group authorization key from the server.

5. The method of claim 1, wherein the detected sensing device is configured to:
   receive a group authorization key from the terminal;
   compare the received group authorization key with a group authorization key stored in a memory of the detected sensing device;
   transmit the data measured from an object to the terminal when the received group authorization key is matched with the stored group authorization key;
   otherwise, transmit the error message to the terminal.

6. The method of claim 1, comprising:
   transmitting a grouping request message for first sensing devices included in a first device group to the server;
   receiving a first group authorization key assigned to the first sensing devices in the first device group from the server in response to the group request message; and
   transmitting the received first group authorization key to the first sensing devices included in the first device group.

7. The method of claim 1, comprising:
   transmitting a same group authorization key to sensing devices included in a same device group.

8. The method of claim 1, comprising:
   transmitting the received data to the server.

9. The method of claim 1, comprising:
   detecting a third sensing device to be removed from a corresponding device group;
   receiving device information from the detected third sensing device;
   obtaining a group authorization key based on the received device information;
   transmitting a deletion request message with the obtained group authorization key to the detected third sensing device;
   receiving a deletion completion message from the detected third sensing device when the detected sensing device has a group authorization key matched with the transmitted group authorization key;
   otherwise, receiving an error message from the detected third sensing device.

10. The method of claim 9, wherein the detected third sensing device is configured to:
    receive the deletion request message with the group authorization key from the terminal;

compare the received group authorization key with a group authorization key stored in a memory of the detected third sensing device;

delete the stored group authorization key and transmit the deletion completion message when the received group authorization key is matched with the stored group authorization key;

otherwise, transmit the error message to the terminal.

11. The method of claim 9, comprising:

determining whether the detected third sensing device is a registered sensing device;

obtaining the group authorization key of the detected third sensing device when the detected third sensing device is the registered sensing device;

otherwise, terminating a deletion procedure.

12. The method of claim 11, wherein the determining comprises:

transmitting a registration confirmation message with the received device information of the detected third sensing device to a server;

receiving a confirmation response message from the server in response to the registration confirmation message; and determining whether the detected third sensing device is the registered sensing device based on the received confirmation response message.

13. The method of claim 1, wherein the detected sensing device is configured to:

receive the key change message with the first group authorization key associated with the current device group and the second group authorization key associated with the new device group from the terminal;

compare the received first group authorization key with a group authorization key stored in a memory of the detected sensing device;

delete the stored group authorization key, store the second group authorization key, transmit the key change completion message when the received first group authorization key is matched with the stored group authorization key;

otherwise, transmit the error message to the terminal.

14. The method of claim 1, comprising:

receiving the first group authorization key associated with the current device group and a second group authorization key associated with the new device group from a server.

15. The method of claim 14, wherein the server is configured to:

analyze data collected from a fourth sensing device to determine whether a current device group of the fourth first sensing device is changed to a new device group; and transmit a second group authorization key associated with the new device group to the terminal.

* * * * *

UNITED STATES PATENT AND TRADEMARK OFFICE
CERTIFICATE OF CORRECTION

PATENT NO. : 9,888,002 B2  
APPLICATION NO. : 14/191780  
DATED : February 6, 2018  
INVENTOR(S) : Yeon-Joo Son et al.

Page 1 of 1

It is certified that error appears in the above-identified patent and that said Letters Patent is hereby corrected as shown below:

In the Claims

In Claim 15, Column 20, Line 23, "first sensing device" should be amended to --sensing device--.

Signed and Sealed this  
Twelfth Day of June, 2018

Andrei Iancu  
*Director of the United States Patent and Trademark Office*